(12) United States Patent
Shin et al.

(10) Patent No.: US 11,756,284 B2
(45) Date of Patent: Sep. 12, 2023

(54) APPARATUS AND METHOD OF LABELING FOR OBJECT DETECTION

(71) Applicant: SAMSUNG SDS CO., LTD., Seoul (KR)

(72) Inventors: Seung Ho Shin, Seoul (KR); Ji Hoon Kim, Seoul (KR); Se Won Woo, Seoul (KR); Kyoung Jin Oh, Seoul (KR); Seong Won Park, Seoul (KR)

(73) Assignee: SAMSUNG SDS CO., LTD., Seoul (KR)

( * ) Notice: Subject to any disclaimer, the term of this patent is extended or adjusted under 35 U.S.C. 154(b) by 330 days.

(21) Appl. No.: 17/177,699

(22) Filed: Feb. 17, 2021

(65) Prior Publication Data
US 2022/0121872 A1    Apr. 21, 2022

(30) Foreign Application Priority Data
Oct. 20, 2020    (KR) ................. 10-2020-0136341

(51) Int. Cl.
*G06V 10/20*   (2022.01)
*G06N 3/08*   (2023.01)
*G06F 18/211*   (2023.01)
*G06F 18/213*   (2023.01)
*G06F 18/214*   (2023.01)
*G06F 18/23213*   (2023.01)
*G06N 3/044*   (2023.01)

(52) U.S. Cl.
CPC .......... *G06V 10/255* (2022.01); *G06F 18/211* (2023.01); *G06F 18/213* (2023.01); *G06F 18/2155* (2023.01); *G06F 18/23213* (2023.01); *G06N 3/044* (2023.01); *G06N 3/08* (2013.01)

(58) Field of Classification Search
CPC .. G06V 10/255; G06V 10/7753; G06V 20/41; G06F 18/211; G06F 18/213; G06F 18/2155; G06F 18/23213; G06F 18/24133; G06N 3/044; G06N 3/08; G06N 3/045; G06N 3/048; G06N 3/04
See application file for complete search history.

(56) References Cited

U.S. PATENT DOCUMENTS

| | | | |
|---|---|---|---|
| 10,540,572 B1 | 1/2020 | Kim et al. | |
| 2016/0104056 A1* | 4/2016 | He | G06V 10/454 |
| | | | 382/158 |
| 2020/0380304 A1* | 12/2020 | Sallee | G06F 18/2155 |
| 2020/0411167 A1* | 12/2020 | Kearney | G06T 7/77 |
| 2021/0027143 A1* | 1/2021 | Joo | G06F 16/2365 |

* cited by examiner

*Primary Examiner* — Jianxun Yang
(74) *Attorney, Agent, or Firm* — Sughrue Mion, PLLC

(57) ABSTRACT

An apparatus of labeling for object detection according to an embodiment of the present disclosure includes an image selector that determines a plurality of labeling target images from among a plurality of unlabeled images, and determines a labeling order of the plurality of labeling target images, a feedback obtainer that obtains label inspection information on the plurality of labeling target images from a user, and a model trainer that learns the label inspection information input from the user by using the labeling target images, obtains a pseudo label for supervised learning based on a learning result using the label inspection information, and re-determines the labeling order of the labeling target images based on the pseudo label.

18 Claims, 4 Drawing Sheets

APPARATUS AND METHOD OF LABELING FOR OBJECT DETECTION

CROSS-REFERENCE TO RELATED APPLICATION AND CLAIM OF PRIORITY

This application claims the benefit under 35 USC § 119(a) of Korean Patent Application No. 10-2020-0136341, filed on Oct. 20, 2020, in the Korean Intellectual Property Office, the entire disclosure of which is incorporated herein by reference for all purposes.

BACKGROUND

1. Field

Embodiments of the present disclosure relate to a labeling technique for object detection.

2. Description of Related Art

A deep Learning model requires a large number of labeled training data for meaningful learning. In particular, in the field of image classification, thousands to tens of thousands or more images with labels are required for training the model.

In addition, detection and segmentation of images have a large difference in labeling quality for each operator, and the difference in labeling quality has a problem that causes performance degradation of the deep learning model.

Accordingly, there has been a need to perform labeling on unlabeled images in an environment where the labeled image is limited or there is no labeled image.

SUMMARY

The disclosed embodiments are intended to provide an apparatus and method of labeling for object detection.

A apparatus of labeling for object detection according to an embodiment includes an image selector that determines a plurality of labeling target images from among a plurality of unlabeled images, and determines a labeling order of the plurality of labeling target images, a feedback obtainer that obtains label inspection information on the plurality of labeling target images from a user, and a model trainer that learns the label inspection information input from the user by using the labeling target images, obtains a pseudo label for supervised learning based on a learning result using the label inspection information, and re-determines the labeling order of the labeling target images based on the pseudo label.

The image selector may include a box proposal network (BPN) architecture for obtaining a bounding box for the plurality of unlabeled images.

The image selector may cluster the plurality of unlabeled images into a preset number of clusters based on feature vectors of the plurality of unlabeled images for the bounding box, and determine the labeling order of the plurality of labeling target images based on the clustering result.

The image selector may determine the labeling order of the plurality of labeling target images based on a size of the bounding box.

The model trainer may extract a feature vector for a region of interest corresponding to a region in which an object is located in the labeling target image, and obtain the pseudo label based on the feature vector.

The model trainer may extract the feature vector including the region of interest based on a region proposal network (RPN) in order to learn the region of interest.

The model trainer may include a network architecture capable of accessing a feature vector of one or more internal layer in a spatial pyramid pooling (SPP)-based model for reducing information loss of the extracted feature vector.

The model trainer may learn the SPP-based model so as not to distinguish between the unlabeled image and the labeled image based on adversarial learning.

The model trainer may include a gradient reversal layer (GRL) network architecture that inverts the feature vector by multiplying a negative scalar value so as not to distinguish between the unlabeled image and the labeled image.

The feature vector may include an object feature vector and an image feature vector, and the gradient reversal layer (GRL) may be applied to each of the object feature vector and the image feature vector.

An method of labeling for object detection according to an embodiment includes determining a plurality of labeling target images from among a plurality of unlabeled images, and determining a labeling order of the plurality of labeling target images, obtaining label inspection information on the plurality of labeling target images from a user, and training a model by learning the label inspection information input from the user by using the labeling target images, obtaining a pseudo label for supervised learning based on a learning result using the label inspection information, and re-determining the labeling order of the labeling target images based on the pseudo label.

In the determining the labeling order, a bounding box for a plurality of unlabeled images may be obtained based on a box proposal network (BPN) structure.

The determining the labeling order may include clustering the plurality of unlabeled images into a preset number of clusters based on feature vectors of the plurality of unlabeled images for the bounding box, and determining the labeling order of the plurality of labeling target images based on the clustering result.

In the determining the labeling order, the labeling order of the plurality of labeling target images may be determined based on a size of the bounding box.

The training the model may include extracting a feature vector for a region of interest corresponding to a region in which an object is located in the labeling target image, and obtaining the pseudo label based on the feature vector In the training the model, the feature vector including the region of interest based on a region proposal network (RPN) may be extracted in order to learn the region of interest.

In the training the model may include a network architecture capable of accessing a feature vector of an internal layer in a spatial pyramid pooling (SPP)-based model for reducing information loss of the extracted feature vector.

The training the model may include extracting the feature vector so as not to distinguish between the unlabeled image and the labeled image based on adversarial learning.

The training the model may include applying a gradient reversal layer (GRL) network architecture that inverts the feature vector by multiplying a negative scalar value so as not to distinguish between the unlabeled image and the labeled image.

The feature vector may include an object feature vector and an image feature vector, and the gradient reversal layer (GRL) may be applied to each of the object feature vector and the image feature vector.

According to the disclosed embodiments, a labeling priority of the image is determined so that a plurality of unlabeled images can be efficiently labeled, and feedback is received from the user by displaying labeling information on the labeling target image, thereby capable of improving an accuracy of labeling.

In addition, according to the disclosed embodiments, a process of obtaining thousands to tens of thousands or more images with a label for supervised learning is simplified by creating a pseudo label for an unlabeled image, thereby capable of reducing the manpower and time required for preparation for learning.

In addition, according to the disclosed embodiments, the object included in the labeling target image includes information on the region of interest indicating the location on the labeling target image, thereby capable of performing the learning of the region of interest that can mainly occur in an industrial image.

DETAILED DESCRIPTION

Hereinafter, a specific embodiment of the present invention will be described with reference to the drawings. The following detailed description is provided to aid in a comprehensive understanding of the methods, apparatus and/or systems described herein. However, this is only an example, and the disclosed embodiments are not limited thereto.

In describing the embodiments, when it is determined that a detailed description of related known technologies can unnecessarily obscure the subject matter of the disclosed embodiments, a detailed description thereof will be omitted. In addition, terms to be described later are terms defined in consideration of functions in the disclosed embodiments, which can vary according to the intention or custom of users or operators. Therefore, the definition should be made based on the contents throughout this specification. The terms used in the detailed description are only for describing embodiments, and should not be limiting. Unless explicitly used otherwise, expressions in the singular form include the meaning of the plural form. In this description, expressions such as "comprising" or "including" are intended to refer to certain features, numbers, steps, actions, elements, some or combination thereof, and it is not to be construed to exclude the presence or possibility of one or more other features, numbers, steps, actions, elements, parts or combinations thereof, other than those described.

Figure 1:
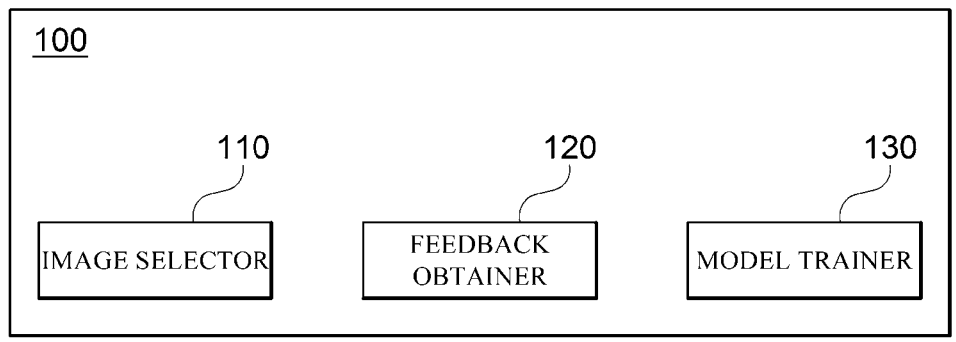
FIG. 1 is a configuration diagram of an apparatus of labeling for object detection according to an embodiment.

FIG. 1 is a configuration diagram of an apparatus of labeling for object detection according to an embodiment.

FIG. 1 is a block diagram illustrating an apparatus 100 of labeling according to an exemplary embodiment.

As illustrated, the apparatus 100 of labeling according to an embodiment includes an image selector 110, a feedback obtainer 120, and a model trainer 130.

According to an embodiment, the apparatus 100 of labeling is a convolutional neural network (CNN)-based model that is trained to output a high-accuracy pseudo label based on a feature vector for each of a plurality of unlabeled images.

According to an embodiment, the image selector 110, the feedback obtainer 120, and the model trainer 130 can be implemented using one or more physically separated devices, or can be implemented by one or more processors or a combination of one or more processors and software, and cannot be clearly distinguished in specific operations unlike the illustrated example.

The image selector 110 determines a plurality of labeling target images from among a plurality of unlabeled images, and determines a labeling order of the plurality of labeling target images.

According to an embodiment, the image selector 110 can include a box proposal network (BPN) architecture for obtaining a bounding box for the plurality of unlabeled images.

According to an embodiment, the image selector 110 can determine an order of a plurality of labeling target images based on a size of the bounding box.

According to an embodiment, the image selector 110 clusters the plurality of unlabeled images into a preset number of clusters based on feature vectors of the plurality of unlabeled images for the bounding box, and determine the labeling order of the plurality of labeling target images based on the clustering result.

In this case, clustering of the feature vectors performed by the image selector 110 can be performed through a conventional K-means clustering technique.

Specifically, the image selector 110 can perform clustering on the feature vector extracted through an artificial neural network architecture with an index for each of the plurality of unlabeled images, and determine the labeling order of the labeling target image so as to prioritize labeling as the difference is smaller by comparing the distance from the center of the cluster acquired based on the plurality of labeling target images.

The feedback obtainer 120 obtains label inspection information for the plurality of labeling target images from a user.

According to an embodiment, the feedback obtainer 120 can provide a plurality of labeling target images on which labels are visually displayed in order to obtain the label inspection information from the user.

The model trainer 130 learns the label inspection information input from the user by using the labeling target image, obtains a pseudo label for supervised learning based on the learning result using the label inspection information, and re-determines the labeling order of the labeling target images based on the pseudo label.

According to an embodiment, the model trainer 130 can extract a feature vector for a region of interest corresponding to a region in which an object is located from the labeling target image, and obtain the pseudo label based on the feature vector.

Hereinafter, the 'region of interest' refers to information indicating where an object included in an image is located on the image by adding a variable that can know the location of the bounding box including objects not in the conventional RPN.

According to an embodiment, the model trainer 130 can extract a feature vector including an RPN-based region of interest in order to learn the region of interest.

According to an embodiment, the model trainer 130 can include a network architecture capable of accessing an internal layer feature vector of a model based on spatial pyramid pooling (SPP) for reducing information loss of the extracted feature vector.

In the conventional SPP-based model for object detection, the feature vector of an out layer passed through the SPP layer where the object is detected is transferred to the classifier in order to determine a class for the object. However, the model trainer 130 has a problem in that a size of the feature vector decreases as the feature vector passes through the pooling layer.

Accordingly, the model trainer 130 can access a plurality of internal layer feature vectors of the SPP-based model in order to solve the problem of information loss, and can preset an accessible internal layer. In addition, the number of internal layers is not necessarily limited to a specific number, and can be changed depending on the embodiment.

According to an embodiment, the model trainer 130 can extract a feature vector so as not to distinguish between an unlabeled image and a labeled image based on adversarial learning, and obtain a pseudo label based on the feature vector. In this case, the order of the labeling target images can be re-determined based on the pseudo label.

According to an embodiment, the model trainer 130 can include a gradient reversal layer (GRL) network architecture that inverts a feature vector by multiplying a negative scalar value so as not to distinguish between the unlabeled image and the labeled image.

In addition, a feature vector inverted by being multiplied with the negative scalar value) can include an object feature vector and an image feature vector, and the GRL network architecture can be applied to each of the object feature vector and the image feature vector.

Figure 2:
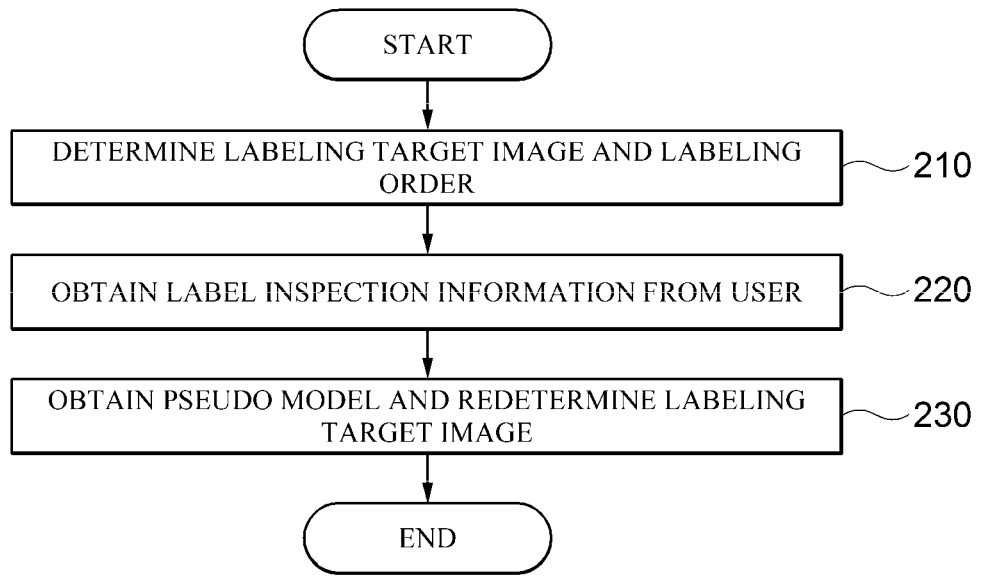
FIG. 2 is a flowchart of a method of labeling for object detection according to an embodiment.

FIG. 2 is a flowchart of a method of labeling for object detection according to an embodiment.

The method illustrated in FIG. 2 can be performed, for example, by the apparatus 100 of labeling illustrated in FIG. 1.

Referring to FIG. 2, the apparatus 100 of labeling determines a plurality of labeling target images from among a plurality of unlabeled images, and determines a labeling order of the plurality of labeling target images (210).

According to an embodiment, the apparatus 100 of labeling can perform a BPN architecture to obtain the bounding box for a plurality of unlabeled images in order to determine the plurality of labeling target images.

According to an embodiment, the image selector 110 can determine a labeling order of the plurality of labeling target images based on the size of the bounding box.

According to an embodiment, the plurality of unlabeled images can be clustered into a preset number of clusters based on feature vectors of the plurality of unlabeled images for the bounding box, and the labeling order of the plurality of labeling target images can be determined based on the clustering result.

In this case, clustering of the coordinate values of the feature vector can be performed through a conventional K-means clustering technique. Specifically, the image selector 110 can perform clustering on the feature vector extracted through an artificial neural network architecture with an index for each of the plurality of unlabeled images, and determine the labeling order of the labeling target image so as to prioritize labeling as the difference is smaller by comparing the distance from the center of the cluster acquired based on the plurality of labeling target images.

After that, the apparatus 100 of labeling obtains label inspection information for a plurality of labeling target images from the user (220).

According to an embodiment, a plurality of labeling target images on which labels are visually displayed can be provided in order to obtain the label inspection information from a user of the apparatus 100 of labeling.

After that, the apparatus 100 of labeling learns the label inspection information input from the user by using the labeling target images, obtains a pseudo label for supervised learning based on the learning result using the label inspection information, and re-determines the labeling order of the labeling target images based on the pseudo label (230).

According to an embodiment, the apparatus 100 of labeling can extract a feature vector for a region of interest corresponding to a region in which an object is located from the labeling target image, and obtain the pseudo label based on the feature vector.

According to an embodiment, the apparatus 100 of labeling can extract a feature vector including a region of interest based on the RPN in order to learn the region of interest.

According to an embodiment, the apparatus 100 of labeling can include a network architecture capable of accessing the internal layer feature vector of the SPP-based model for reducing information loss of the extracted feature vector.

For example, the apparatus 100 of labeling can access one or more internal layer feature vectors of the SPP-based model by using the labeling target image, and can preset accessible internal layers.

According to an embodiment, the apparatus 100 of labeling can extract the feature vector so as not to distinguish between the unlabeled image and the labeled image based on adversarial learning, and obtain the pseudo label based on the feature vector. In this case, the order of the labeling target images can be re-determined based on the pseudo label.

According to an embodiment, the apparatus 100 of labeling can include a GRL network architecture that inverts the feature vector by multiplying a negative scalar value so as not to distinguish between the unlabeled image and the labeled image.

The feature vector inverted by being multiplied with the negative scalar value can include an object feature vector and an image feature vector, and the GRL network architecture can be applied to each of the object feature vector and the image feature vector.

Meanwhile, in the flowchart illustrated in FIG. 2, at least some of the steps can be performed in a different order, performed together by being combined with other steps, omitted, performed by being divided into detailed steps, or performed by being added with one or more steps (not illustrated).

Figure 3:
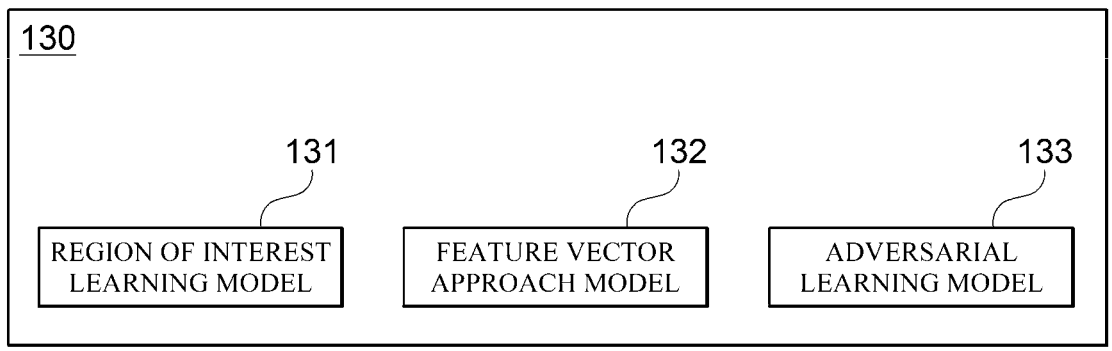
FIG. 3 is a configuration diagram of a model trainer included in an apparatus of labeling for object detection according to an embodiment.

FIG. 3 is a configuration diagram of a model trainer included in an apparatus of labeling for object detection according to an embodiment.

FIG. 3 is a block diagram illustrating the model trainer 130 according to an embodiment.

As illustrated, the model trainer 130 according to an embodiment includes a region of interest learning model 131, a feature vector approach model 132, and an adversarial learning model 133.

In addition, in an embodiment, the region of interest learning model 131, the feature vector access model 132, and the adversarial learning model 133 can be implemented using one or more physically separated devices, or can be implemented by one or more processors or a combination of one or more processors and software, and cannot be clearly distinguished in specific operations unlike the illustrated example.

The region of interest learning model 131 is a model for extracting the feature vector for the region of interest corresponding to a region in which an object is located from a labeling target image, and obtaining the pseudo label based on the feature vector.

According to an embodiment, when the feature vector used in the conventional RPN has a size of [batch size, height, width, channels], the region-of-interest learning model 131 can generate a vector of size [1, 10, 10, 1] filled with 0, cut the generated vector to into the size of the feature vector used in the RPN and perform a convolution operation on the generated vector, and extract the feature vector including the region of interest.

The feature vector access model 132 includes a network architecture capable of accessing the internal layer feature vector of the spatial pyramid pooling (SPP)-based model for reducing information loss of the extracted feature vector.

According to an embodiment, one or more internal layer feature vectors of the SPP-based model can be accessed, and accessible internal layers can be preset. In addition, the number of internal layers is not necessarily limited to a specific number, and can be changed depending on the embodiment.

The adversarial learning model 133 can obtain the pseudo label based on a common feature vector that cannot distinguish the unlabeled image and the labeled image.

In this case, the adversarial learning model can use a binary discriminator to distinguish between the unlabeled image and the labeled image.

According to an embodiment, the adversarial learning model 133 can include the GRL network architecture that inverts a feature vector by multiplying a negative scalar value so as not to distinguish between the unlabeled image and the labeled image.

For example, the adversarial learning model 133 can extract a common feature vector of an unlabeled image and a labeled image by being designed to reduce loss when the adversarial learning model 133 fails to distinguish between the unlabeled image and the labeled image while performing backpropagation by multiplying the feature vector of the unlabeled image and the labeled image by a negative scalar value.

In addition, the feature vector inverted by being multiplied with the negative scalar value can include an object feature vector and an image feature vector, and the GRL network architecture can be applied to each of the object feature vector and the image feature vector.

Figure 4:
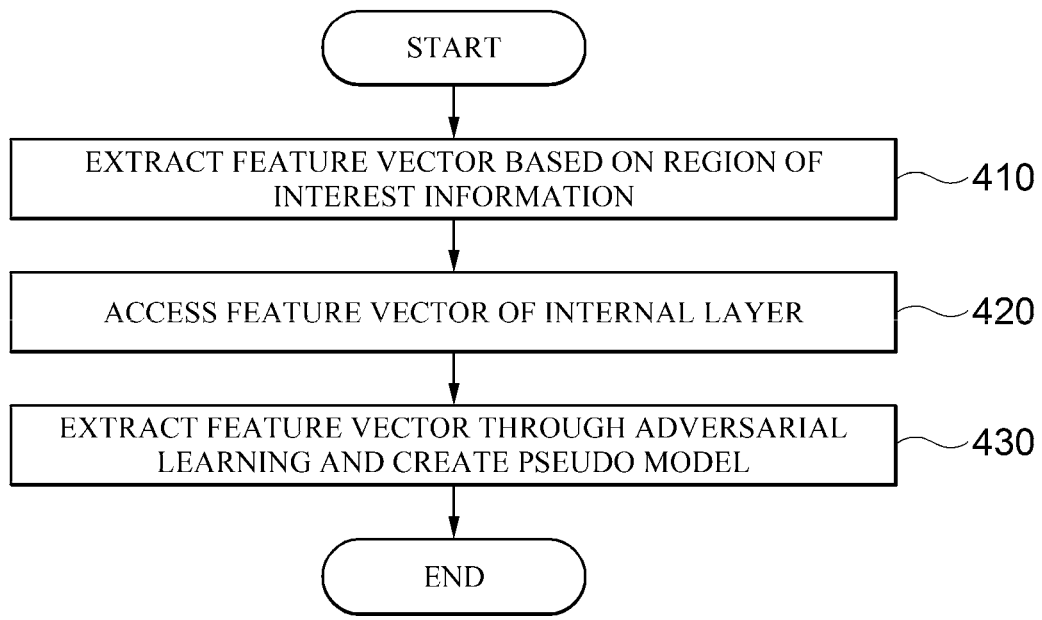
FIG. 4 is a flowchart of a method of labeling for object detection according to an embodiment.

FIG. 4 is a flowchart of a method of labeling for object detection according to an embodiment.

The method illustrated in FIG. 4 can be performed by, for example, the model trainer 130 illustrated in FIG. 3.

Referring to FIG. 4, first, the model trainer 130 extracts a feature vector based on a region of interest (410).

According to an embodiment, a feature vector including a region of interest based on the RPN can be extracted in order to learn the region of interest.

After the model trainer 130 accesses the internal layer feature vector in order to increase the accuracy of labeling (420).

According to an embodiment, a required feature vector can be obtained by accessing one or more internal layer feature vectors in an SPP-based model.

After that, the model trainer 130 extracts a feature vector so as not to distinguish between the unlabeled image and the labeled image based on adversarial learning, and obtains the pseudo label based on the feature vector (430).

According to an embodiment, the model trainer 130 applies the GRL network architecture that inverts a feature vector by a negative scalar value to learn the feature vector so as not to distinguish between the unlabeled image and the labeled image According to an embodiment, the model trainer 130 can obtain the pseudo label based on a common feature vector that cannot distinguish the unlabeled image and the labeled image.

Figure 5:
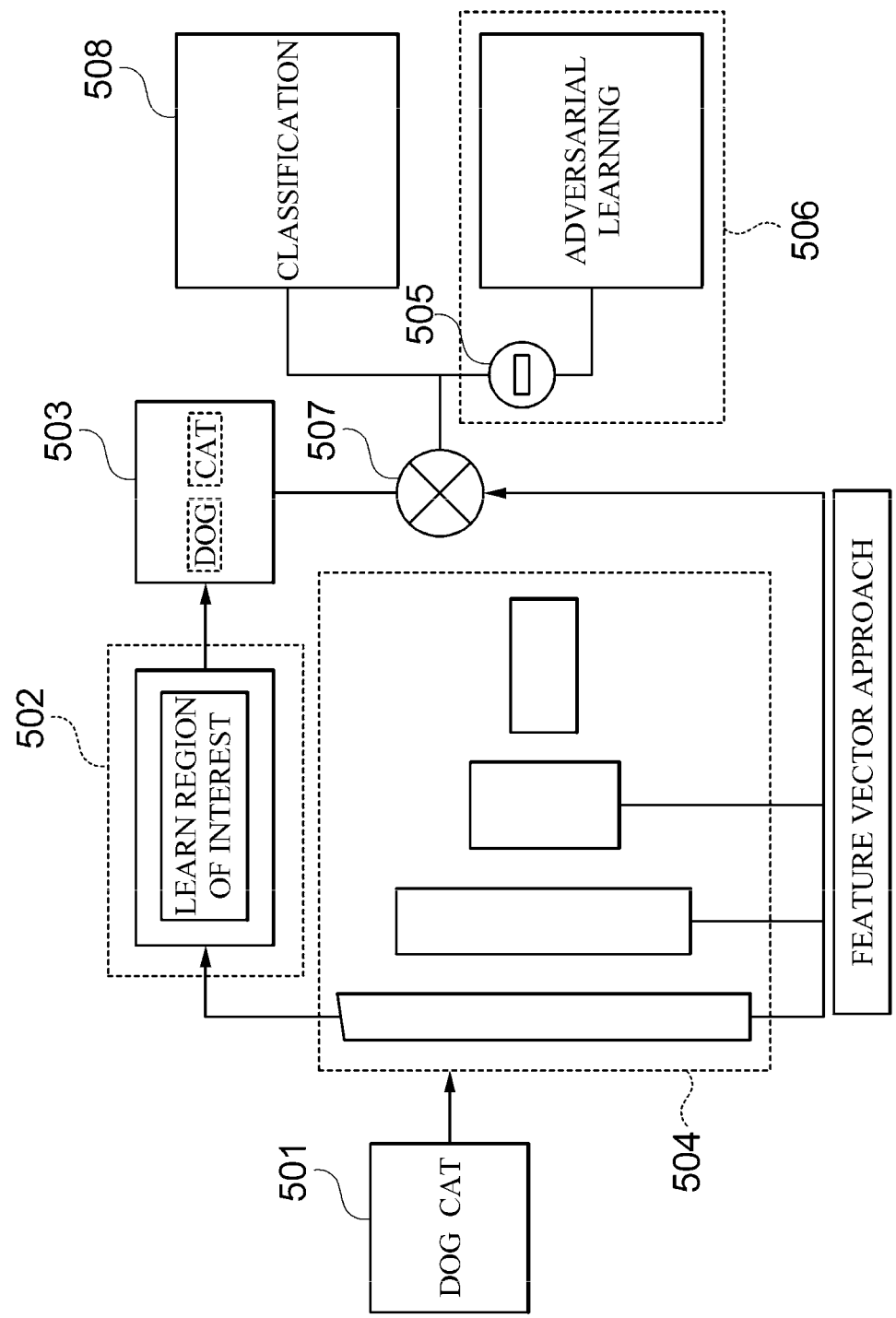
FIG. 5 is a diagram schematically illustrating a learning architecture of a model trainer according to an embodiment.

FIG. 5 is a diagram schematically illustrating a learning architecture of the model trainer according to an embodiment.

Referring to FIG. 5, a feature vector 502 including a region of interest based on the RPN is extracted for an unlabeled image 501 including two objects of a dog and a cat, and a pseudo label 503 for the dog and cat is obtained based on the feature vector. An SPP-based model is performed on the unlabeled image 501 and then, a convolution operation 507 is performed using one or more internal layer feature vectors 504. In this case, the pseudo label is updated by backpropagating the convolution operation, based on an adversarial learning model 506 including the GRL network architecture 505 that inverts to the feature vector by multiplying a negative scalar value so as not to distinguish between an unlabeled image and a labeled image, and classification 508 is performed based on the labeled image as a result of label inspection obtained from the user.

Figure 6:
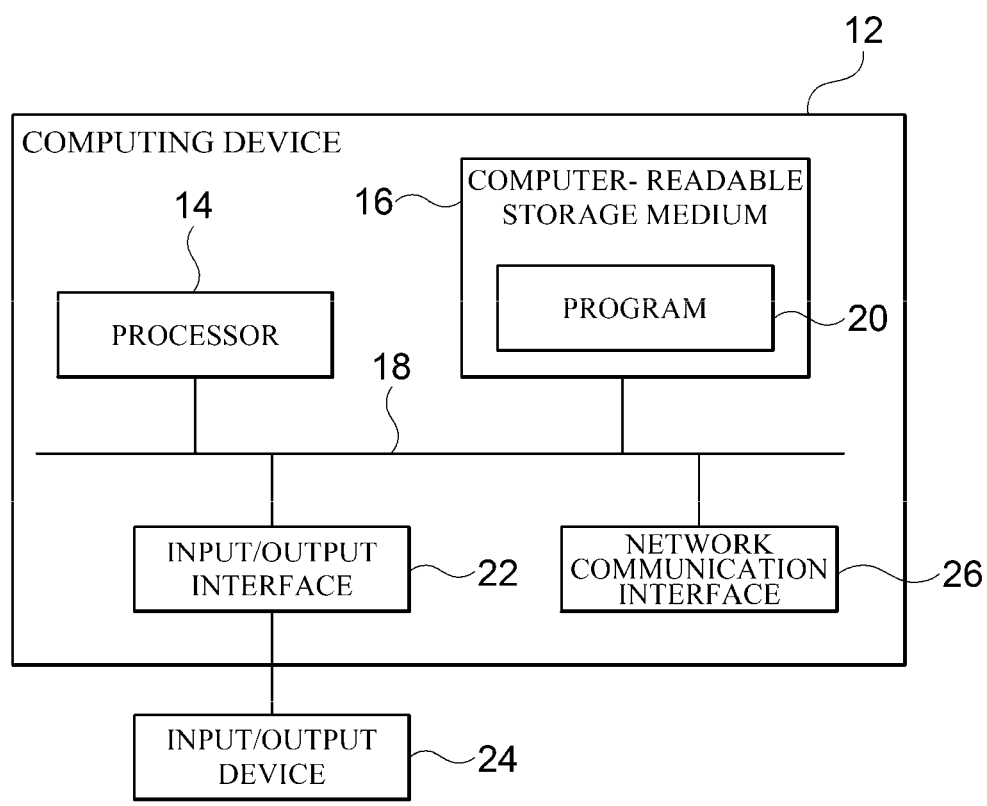
FIG. 6 is a block diagram illustratively describing a computing environment including a computing device according to an exemplary embodiment.

FIG. 6 is a block diagram illustrating and describing a computing environment including a computing device suitable for use in example embodiments.

In the illustrated embodiment, each component can have different functions and capabilities in addition to those described below, and additional components can be included in addition to those described below.

The illustrated computing environment 10 includes a computing device 12. In one embodiment, a computing device 12 can be one or more components included in a function generating device 100 illustrated in FIG. 1.

The computing device 12 includes at least one processor 14, a computer-readable storage medium 16, and a communication bus 18. The processor 14 can cause the computing device 12 to operate according to the exemplary embodiment described above. For example, the processor 14 can execute one or more programs stored on the computer-readable storage medium 16. The one or more programs can include one or more computer-executable instructions, which, when executed by the processor 14, can be configured to cause the computing device 12 to perform operations according to the exemplary embodiment.

The computer-readable storage medium 16 is configured to store the computer-executable instruction or program code, program data, and/or other suitable forms of information. A program 20 stored in the computer-readable storage medium 16 includes a set of instructions executable by the processor 14. In one embodiment, the computer-readable storage medium 16 can be a memory (volatile memory such as a random access memory, non-volatile memory, or any suitable combination thereof), one or more magnetic disk storage devices, optical disk storage devices, flash memory devices, other types of storage media that are accessible by the computing device 12 and capable of storing desired information, or any suitable combination thereof.

The communication bus 18 interconnects various other components of the computing device 12, including the processor 14 and the computer-readable storage medium 16.

The computing device 12 can also include one or more input/output interfaces 22 that provide an interface for one or more input/output devices 24, and one or more network communication interfaces 26. The input/output interface 22 and the network communication interface 26 are connected to the communication bus 18. The input/output device 24 can be connected to other components of the computing device 12 through the input/output interface 22. The exemplary input/output device 24 can include a pointing device (such as a mouse or trackpad), a keyboard, a touch input device (such as a touch pad or touch screen), a voice or sound input device, input devices such as various types of sensor devices and/or photographing devices, and/or output devices such as a display device, a printer, a speaker, and/or a network card. The exemplary input/output device 24 can be included inside the computing device 12 as a component constituting the computing device 12, or can be connected to the computing device 12 as a separate device distinct from the computing device 12.

Although the present invention has been described in detail through representative examples above, those skilled in the art to which the present invention pertains will understand that various modifications can be made thereto within the limit that do not depart from the scope of the present invention. Therefore, the scope of rights of the present invention should not be limited to the described embodiments, but should be defined not only by claims set forth below but also by equivalents of the claims.

What is claimed is:

1. An apparatus of labeling for object detection, the apparatus comprising one or more processors that implement:
    an image selector configured to determine a plurality of labeling target images from among a plurality of unlabeled images, and determine a labeling order of the plurality of labeling target images;
    a feedback obtainer configured to obtain label inspection information on the plurality of labeling target images from a user; and
    a model trainer configured to learn the label inspection information input from the user by using the plurality of labeling target images, obtain a pseudo label for supervised learning based on a learning result using the label inspection information, and re-determine the labeling order of the plurality of labeling target images based on the pseudo label,
    wherein the model trainer is further configured to extract a feature vector of a labeling target image and obtain the pseudo label based on the feature vector, and
    wherein the model trainer includes a gradient reversal layer (GRL) network architecture that inverts the feature vector by multiplying a negative scalar value so as not to distinguish between an unlabeled image and a labeled image.

2. The apparatus of claim 1, wherein the image selector includes a box proposal network (BPN) architecture for obtaining a bounding box for the plurality of unlabeled images.

3. The apparatus of claim 2, wherein the image selector is further configured to cluster the plurality of unlabeled images into a preset number of clusters based on feature vectors of the plurality of unlabeled images for the bounding box, and determine the labeling order of the plurality of labeling target images based on a clustering result.

4. The apparatus of claim 3, wherein the image selector is further configured to determine the labeling order of the plurality of labeling target images based on a size of the bounding box.

5. The apparatus of claim 1, wherein the model trainer is further configured to extract the feature vector for a region of interest corresponding to a region in which an object is located in the labeling target image.

6. The apparatus of claim 5, wherein the model trainer is further configured to extract the feature vector including the region of interest based on a region proposal network (RPN) in order to learn the region of interest.

7. The apparatus of claim 6, wherein the model trainer includes a network architecture capable of accessing a feature vector of an internal layer in a spatial pyramid pooling (SPP)-based model for reducing information loss of the extracted feature vector.

8. The apparatus of claim 6, wherein the model trainer is further configured to extract the feature vector so as not to distinguish between the unlabeled image and the labeled image based on adversarial learning using the GRL network.

9. The apparatus of claim 1, wherein the feature vector includes an object feature vector and an image feature vector, and the GRL network is configured to apply to each of the object feature vector and the image feature vector.

10. A method of labeling for object detection, the method comprising:
    determining a plurality of labeling target images from among a plurality of unlabeled images, and determining a labeling order of the plurality of labeling target images;
    obtaining label inspection information on the plurality of labeling target images from a user; and
    training a model by learning the label inspection information input from the user by using the plurality of labeling target images, obtaining a pseudo label for supervised learning based on a learning result using the label inspection information, and re-determining the labeling order of the plurality of labeling target images based on the pseudo label,
    wherein the training the model comprises extracting a feature vector of a labeling target image and obtaining the pseudo label based on the feature vector, and
    wherein the training the model further comprises applying a gradient reversal layer (GRL) network architecture that inverts the feature vector by multiplying a negative scalar value so as not to distinguish between an unlabeled image and a labeled image.

11. The method of claim 10, wherein the determining the labeling order comprises obtaining a bounding box for the plurality of unlabeled images based on a box proposal network (BPN) structure.

12. The method of claim 11, wherein the determining the labeling order comprises clustering the plurality of unlabeled images into a preset number of clusters based on feature vectors of the plurality of unlabeled images for the bounding box, and determining the labeling order of the plurality of labeling target images based on a clustering result.

13. The method of claim 12, wherein the determining the labeling order comprises determining the labeling order of the plurality of labeling target images is determined based on a size of the bounding box.

14. The method of claim 10, wherein the extracting the feature vector comprises extracting the feature vector for a region of interest corresponding to a region in which an object is located in the labeling target image.

15. The method of claim 14, wherein the extracting the feature vector further comprises extracting the feature vector including the region of interest based on a region proposal network (RPN) in order to learn the region of interest.

16. The method of claim 15, wherein the training the model further comprises applying a network architecture capable of accessing a feature vector of an internal layer in a spatial pyramid pooling (SPP)-based model for reducing information loss of the extracted feature vector.

17. The method of claim 15, wherein the extracting the feature vector further comprises extracting the feature vector so as not to distinguish between the unlabeled image and the labeled image, based on adversarial learning using the GRL network.

18. The method of claim 10, wherein the feature vector comprises an object feature vector and an image feature vector, and the GRL network is configured to apply to each of the object feature vector and the image feature vector.

* * * * *